(12) United States Patent
Kiezebrink

(10) Patent No.: US 12,006,909 B2
(45) Date of Patent: Jun. 11, 2024

(54) HORIZONTAL AXIS WIND TURBINE AND METHOD FOR GENERATING ELECTRICAL ENERGY

(71) Applicant: Dutch Ventus IP B.V., PE Rijssen (NL)

(72) Inventor: Popke Lammert Sjoerd Kiezebrink, MB Ermelo (NL)

(73) Assignee: DUTCH VENTUS IP B.V., Pe Rijssen (NL)

( * ) Notice: Subject to any disclaimer, the term of this patent is extended or adjusted under 35 U.S.C. 154(b) by 0 days.

(21) Appl. No.: 18/008,787

(22) PCT Filed: Jun. 9, 2021

(86) PCT No.: PCT/EP2021/065490
§ 371 (c)(1),
(2) Date: Dec. 7, 2022

(87) PCT Pub. No.: WO2021/250107
PCT Pub. Date: Dec. 16, 2021

(65) Prior Publication Data
US 2023/0220826 A1    Jul. 13, 2023

(30) Foreign Application Priority Data

Jun. 10, 2020 (NL) ..................... 2025800

(51) Int. Cl.
*F03D 1/06* (2006.01)
*F03D 1/04* (2006.01)
*F03D 9/25* (2016.01)

(52) U.S. Cl.
CPC ............ *F03D 1/0675* (2013.01); *F03D 1/04* (2013.01); *F03D 9/25* (2016.05); *F05B 2240/13* (2013.01); *Y02B 10/30* (2013.01); *Y02E 10/72* (2013.01)

(58) Field of Classification Search
CPC ... F03D 1/04; F03D 1/06; F03D 1/065; F03D 1/0675; F03D 1/101; F03D 1/181; F03D 9/25; F03D 80/80; F03D 80/88; F03D 80/881; F05B 2240/13; Y02B 10/30; Y02E 10/72
See application file for complete search history.

(56) References Cited

U.S. PATENT DOCUMENTS 10,770,952 B2 *  9/2020  Kiezebrink .......... H02K 7/1823
2003/0137149 A1  7/2003  Northrup et al.

FOREIGN PATENT DOCUMENTS

| CN | 108843498 A | 11/2018 |
| WO | WO 2015/190916 A1 | 12/2015 |
| WO | WO 2016/085858 A1 | 6/2016 |
| WO | WO-2016085858 A1 * | 6/2016 |
| WO | WO 2020/091601 A1 | 5/2020 |
| WO | WO-2020091601 A1 * | 5/2020 |

* cited by examiner

*Primary Examiner* — Loren C Edwards
(74) *Attorney, Agent, or Firm* — Blank Rome LLP

(57) ABSTRACT

A horizontal axis wind turbine comprises a turbine unit, a turbine unit supporting frame, a generator configured for generating electrical energy, and a yaw bearing mechanism. The turbine unit is supported on one or more bearings by the turbine unit supporting frame. The turbine unit is rotatable about a horizontal rotation axis to drive the generator in a direction of rotation.

16 Claims, 8 Drawing Sheets

HORIZONTAL AXIS WIND TURBINE AND METHOD FOR GENERATING ELECTRICAL ENERGY

CROSS-REFERENCE TO RELATED APPLICATIONS

This application is a U.S. national stage of International Application No. PCT/EP2021/065490, filed Jun. 9, 2021, which claims priority to The Netherlands Application No. 2025800, filed Jun. 10, 2020, the entirety of each of which are incorporated by reference herein

FIELD OF THE INVENTION

The present invention relates to a horizontal axis wind turbine.

BACKGROUND OF THE INVENTION

In the art, horizontal wind turbines are known of a type comprising a turbine unit, a turbine unit supporting frame, a generator configured for generating electrical energy, and a yaw bearing mechanism. The turbine unit is supported on one or more bearings by the turbine unit supporting frame and is rotatable about a horizontal rotation axis to drive the generator in a direction of rotation to generate electrical energy. The yaw bearing mechanism is configured for mounting the turbine unit supporting frame to a support structure such that the turbine unit supporting frame is rotatable about a Z-axis.

An example of such a horizontal wind turbine is shown in WO2015/190916. Another example is shown in WO2020/091601.

OBJECT OF THE INVENTION

It is desirable to develop horizontal wind turbines of this type for use as urban wind turbines, e.g. to be placed on top of buildings, e.g. within cities, in industrial zones, on farms, at festivals, in remote onshore locations, etc. The wind turbine may also be of use close to or at sea, e.g. on a breakwater of a port, or on an offshore structure, e.g. to generate electricity on an unmanned offshore platform.

During actual operation, the wind obviously varies from time to time. Whilst at locations close to a shoreline the wind is usually quite strong, more inland locations have a yearly average wind speed that is much lower. Existing wind turbine designs show low overall efficiency, especially at locations having mostly low wind speeds.

The invention aims to provide measures that result in an efficiency improvement over existing horizontal wind turbines of this type.

SUMMARY OF THE INVENTION

The invention provides a horizontal axis wind turbine according to claim 1.

The wind turbine is configured so that, in use, the wind flows through and past the turbine unit including along the inner shroud surface and the outer shroud surface from the front end to the rear end of the outer tubular shroud. In this configuration, no stationary shroud surrounds the rotatable turbine unit, allowing the wind to flow over the outer shroud surface of the turbine unit and to be forced outwardly by the brim flange at the rear end of the outer shroud surface so as to induce a downstream low-pressure region.

For example, the turbine unit is mainly made of plastic material(s), e.g. of composite plastic material. For example, a mould is used to produce turbine unit elements that are assembled in a circumferential array onto the turbine unit. For example, each element comprises a part of the outer shroud, one of the main faces of one blade and the opposed main face of an adjacent blade, and part of the central hub. Herein, for example, composite plastic material is applied on a mould. The elements are then joined to form the turbine unit.

For example, a steel shaft extends through the central hub. For example, the steel shaft has steel flanges at the front and at the rear of the turbine unit, to which the composite plastic material turbine unit is fastened.

Each rigid twisted blade has a leading edge, a trailing edge, a chord length between the leading edge and the trailing edge, a root end, and a tip end.

The root end of each twisted blade is integral with the central hub and the tip end is integral with the outer tubular shroud so that the turbine unit is a rigid unit. The blades have a significant chord length that is at least $\frac{1}{5}$, preferably at least $\frac{1}{3}$, of a smallest inner diameter of the outer tubular shroud.

The leading edge and the trailing edge of each blade adjoin the outer tubular shroud. The leading edge and the trailing edge also adjoin the central hub. So each rigid twisted blade is fully integral with the outer shroud and with the central hub, allowing for optimal distribution of forces within the structure of the turbine unit.

Each rigid twisted blade has a first main surface and an opposed second main surface. One could also identify these surfaces as an upper surface and a lower surface from the perspective of an airplane wing. Each of said first main surface and second main surface extends from the leading edge to the trailing edge of the blade. Seen in the direction of rotation of the rotatable turbine unit during operation, the first main surface precedes or is ahead of the second main surface.

The first main surface and the second main surface of the twisted blades each have a gradual twist from the leading edge towards the trailing edge, which twist is counter to the direction of rotation during operation of the turbine.

The invention proposes that each twisted blade is embodied as an aerofoil having a profile with a mean camber line midway between the first main surface and second main surface, wherein the profile has a thickness that varies in direction of the camber line, said thickness being perpendicular to the camber line. The profile of the aerofoil is configured to produce a lift force that contributes to the electricity generating rotation of the turbine unit in the direction of rotation.

The invention also proposes that the outer tubular shroud has over a majority of the shroud length, e.g. over at least 60% of the shroud length, a conical shroud section that extends up to the rear end of the outer tubular shroud, in which conical shroud section the inner shroud surface and the outer shroud surface each gradually increase in diameter towards the rear end of the outer tubular shroud. At the rear end of the outer tubular shroud, the outer tubular shroud is provided with an outwardly protruding annular brim flange.

The invention further envisages that the central hub comprises a conical hub section in which the exterior hub surface increases in diameter towards the rear end of the central hub, which conical hub section extends over a length along the rotation axis, at least through the conical shroud section.

The provision of the lift producing aerofoil profile, of the brim flange, and the coaxial arrangement of the conical shroud section and the conical hub section act in combination to provide an overall efficiency improvement of the wind turbine. In general terms, the brim flange at the end of the relatively long conical outer shroud section, which brim flange rotates along with the turbine unit of which it is part, induces a low pressure region downstream thereof. Together with the conical hub section concentrically within the conical shroud section this low pressure region promotes the air flow rate through the turbine unit as well as promotes an air flow field distribution of the flow through the turbine unit, seen in front view onto the turbine unit, that is focused more towards the outer shroud, so away from the rotation axis. Thereby, considering the electrical energy output of the wind turbine on a yearly basis, an improved overall efficiency of the wind turbine is achieved compared to prior art designs. In addition, noise production is minimal.

In practical embodiments, the length of the outer shroud is between 0.40 and 1.0 times the smallest inner diameter of the outer shroud. For example, this ratio is about 0.6. This range is, for example, practical in combination with a smallest inner diameter of at least 1 meter, e.g. between 1.5 and 5 meter, e.g. between 2 and 3 meters.

In embodiments, the conical shroud section has a taper angle between 10° and 20°, e.g. between 12° and 18°, e.g. about 15°. Preferably, this taper angle is substantially constant over the length of the conical shroud section.

In embodiments, the conical shroud section has a substantially constant wall thickness between the inner and the outer shroud surfaces.

In embodiments, the brim flange is directed at an angle of at least 45°, preferably at least 60°, relative to the rotation axis.

In embodiments, the brim flange has an outer diameter of at most 110% of the maximum diameter of the conical shroud section direct forward of the brim flange. For example, this maximum is practical in combination with a smallest inner diameter of at least 1 meter, e.g. between 1.5 and 5 meter, e.g. between 2 and 3 meters. Generally, the brim flange in the inventive combination does not need to be large in order to obtain the benefits of the inventive combination of features.

In embodiments, the conical hub section extends rearward beyond the conical shroud section, preferably over a length that is at least 10% of the length of the outer tubular shroud. This enhances the effect of the conical hub section and promotes increased flow rate through the turbine unit.

In embodiments, the conical hub section has a taper angle that is smaller than the taper angle of the conical shroud section, e.g. between 5° and 10°. This enhances the flow rate of air through the turbine unit.

In embodiments, measured in a plane defined by the rear end of the outer tubular shroud, the exterior hub surface of the central hub has a diameter of at least 10%, e.g. at least 15%, of the inner diameter of the outer tubular shroud. This, on the one hand, allows for the beneficial effect of the conical hub section, and, on the other hand, avoids that the exit side of the turbine unit is obstructed too much by the conical hub section.

In embodiments, the outer tubular shroud has a leading shroud section extending from the front end of the outer tubular shroud to the conical shroud section, wherein—in the leading shroud section—the outer surface has a substantially constant diameter that adjoins the conically widening outer surface of the conical shroud section. Preferably, the join is devoid of any sharp transition so as to avoid disruption of airflow along the outer shroud surface.

In embodiments, the outer shroud surface is smooth and of circular cross-section, devoid of any air flow disrupting features apart from the brim flange at the rear end.

In embodiments, in the leading shroud section, the inner shroud surface has at the front end an inward bevelled nose portion that adjoins a substantially constant diameter portion that adjoins a conical inner surface portion that forms a forward continuation of the conical inner surface of the conical shroud section. In practical embodiments, the thickness at the nose of the leading shroud section may be more than the thickness of the conical shroud section. The latter is, preferably, substantially constant between the join to the leading shroud section and the brim flange.

In embodiments, the trailing end of each twisted blade adjoins the conical outer tubular shroud at an axial spacing forward from a plane defined by the rear end of the outer tubular shroud, which axial spacing is at least 15%, preferably between 20% and 40%, e.g. about 30% of the length of the outer tubular shroud. Thereby, a relative spacing is created between the trailing edge of the twisted blades on the one hand and the low-pressure region created by the brim flange on the other hand, which enhances airflow and airflow stability through the turbine unit. In embodiments, the trailing end of each twisted blade adjoins the central hub at an axial location that is more rearward than the join to the outer shroud. For example, the join to the central hub is at most 10% of the length of the outer tubular shroud forward from the plane defined by the rear end of the outer tubular shroud. In an embodiment, the join to the central hub is in or proximate this rear plane. For example, the twisted blades do not adjoin any rearward-protruding portion of the central hub, when present.

In embodiment, seen in front view, the root end of each twisted blade develops about the central hub over an angle relative to the rotation axis that is equal or greater in degrees than 360/number of blades and equal or less in degrees than 720/number of blades. Herein, seen in front view, the tip end of each twisted blade develops along the inner shroud surface over an angle relative to the rotation axis that is equal or less in degrees than 360/number of blades, so that in this front view each blade overlaps in front of one adjacent blade in proximity to the central hub, and so that, in front view, the leading edge of said overlapping blade and the trailing edge of the one adjacent blade from boundaries of an unobstructed axial opening through the turbine unit.

The inventive wind turbine is primarily conceived for urban locations, but could also be used in more remote, even shoreline or offshore, locations.

In practical embodiments the smallest inner diameter of the outer tubular shroud is at least 1 meter, e.g. between 1.5 and 5 meters, e.g. between 2 and 3 meters. These dimensions allow, for example, for use as an urban wind turbine. Of course, the same design may be used offshore, e.g. on an offshore installation, e.g. a hydrocarbon production installation, on-board a vessel, etc.

In practical embodiments, with a smallest inner diameter of the outer tubular shroud of at least 1 meter, e.g. between 1.5 and 5 meters, e.g. between 2 and 3 meters, the turbine unit will have an operational range of between 40 and 160 revolutions per minute (RPM) depending on wind speed.

It will be appreciated that in a practical embodiment the smallest inner diameter of the outer tubular shroud may be 1.5 and 5 meters, e.g. between 2 and 3 meters.

In embodiments, the turbine unit has three, four, or five rigid twisted blades, e.g. four blades. For example, for a smallest inner diameter of the outer tubular shroud between 2 and 3 meters, four blades are practical.

In embodiments, the central hub comprises a metallic shaft, e.g. a hollow shaft, e.g. the blades and the outer shroud being made of plastic material(s). In embodiments, the metallic shaft is supported on bearings at opposite ends thereof relative to the supporting frame. For example, the front bearing is formed by one or more bearings of an electrical generator having a shaft that is integral with the metallic shaft of the central hub.

In an embodiment, the central hub comprises a metallic shaft that is supported on bearings at the front and rear end thereof.

In embodiments, the turbine unit supporting frame comprises:
  a lower frame member extending underneath the turbine unit,
  a front turbine supporting arm connected to the lower frame member and extending in front of the turbine unit,
  a rear turbine supporting arm connected to the lower frame member and extending behind the turbine unit, e.g. wherein the rear turbine supporting arm is embodied as a vertical wind vane assisting the orienting of the turbine unit to the actual wind direction,
wherein each of the arms supports the central hub, e.g. the metallic shaft, of the turbine unit on one or more bearings, e.g. one or more bearings being part of the electrical generator.

For example, the electrical generator is supported on the front turbine supporting arm.

In embodiments, the turbine unit supporting frame comprises a stabilizing wing secured to the supporting frame remote from the turbine unit, wherein in use wind directed onto the front of the turbine unit also acts on the stabilizing wing and said interaction with the stabilizing wing generates a lift force at a location that is offset from the Z axis (Z), said lift force (L) counteracting a moment force on said yaw bearing mechanism. For example, the stabilizing wing is construed and mounted as described in WO2020/091601.

In embodiments, the stabilizing wing is arranged below the turbine unit, e.g. in proximity of an outlet side thereof.

In embodiments, the stabilizing wing is mounted at an angle of attack (α) of between −5 and 15 degrees with respect to the horizontal axis, preferably at an angle of attack (α) of between 2 and 10 degrees.

In embodiments, the yaw bearing mechanism is a free yaw bearing mechanism, i.e. of the type that allows a self-orienting of the turbine unit with respect to incoming wind. In another embodiment, the yaw bearing mechanism comprises a yaw motion drive motor, e.g. linked to a wind direction sensor, and is configured to orient the turbine unit with respect to incoming wind.

The present invention also relates to a method for generating electrical energy wherein use is made of a horizontal axis wind turbine as disclosed herein.

The present invention also relates to a turbine unit as described herein.

The present invention also relates to the production of a turbine unit as described herein.

The invention will now be described with reference to the drawings.

DETAILED DESCRIPTION

Figure 1:
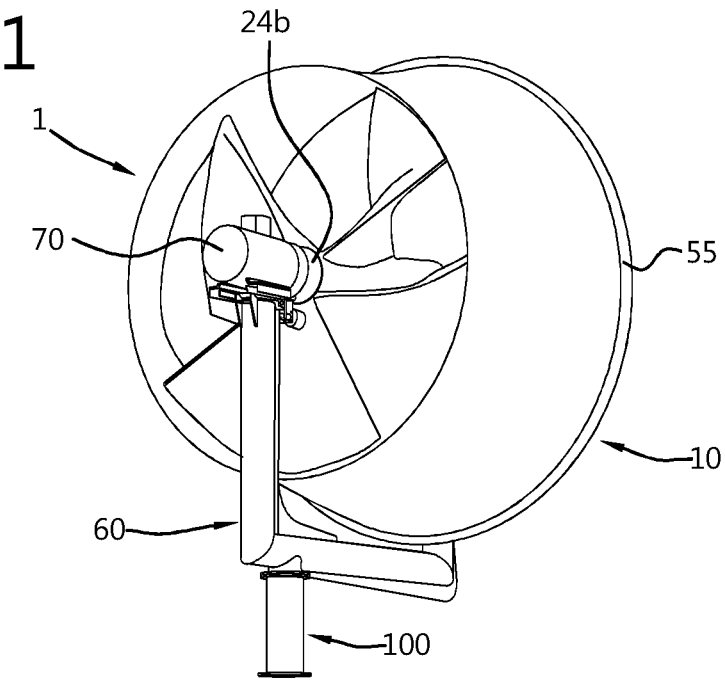
FIG. 1 shows an exemplary embodiment of a wind turbine according to the invention mounted on a support structure.
Figure 2:
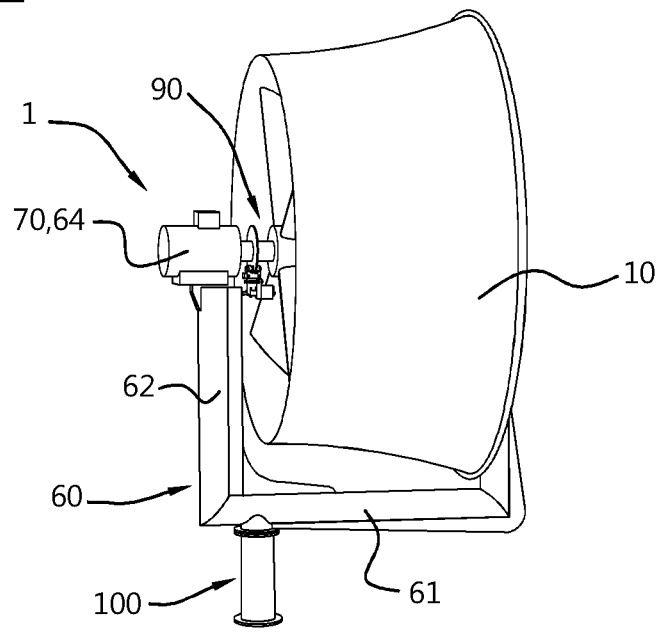
FIG. 2 shows the wind turbine of FIG. 1 from a different angle.
Figure 3:
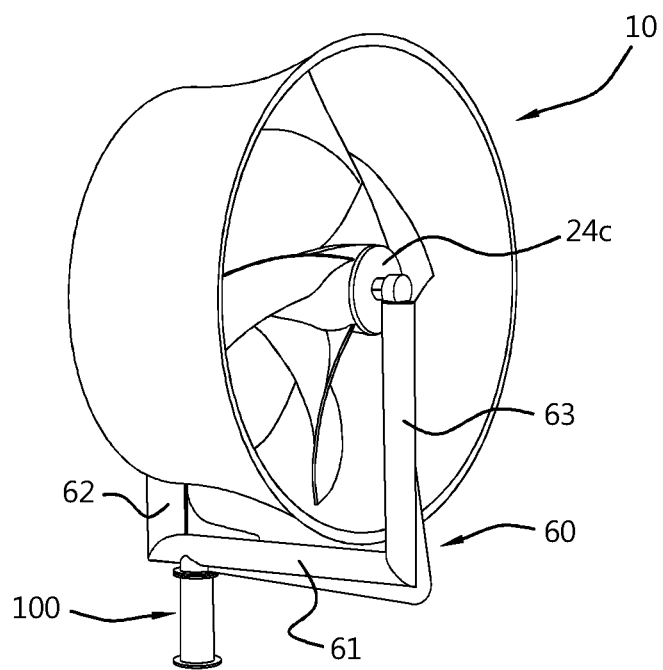
FIG. 3 shows the wind turbine of FIG. 1 in a perspective view from behind.
Figure 4:
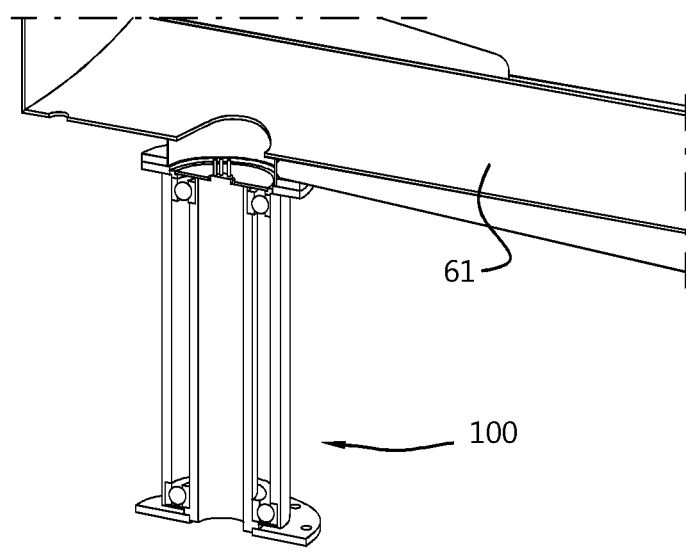
FIG. 4 shows the yaw bearing of the wind turbine of FIG. 1.
Figure 5:
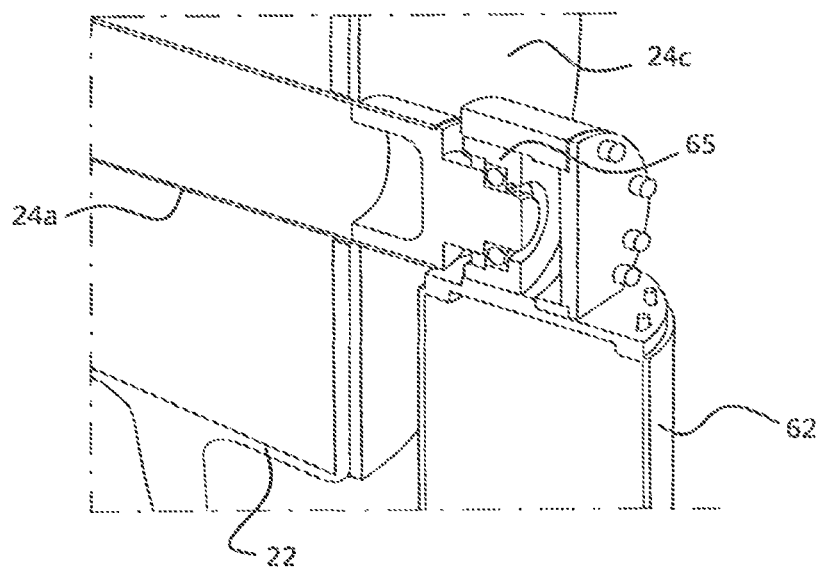
FIG. 5 shows the rear bearing of the wind turbine of FIG. 1.
Figure 6:
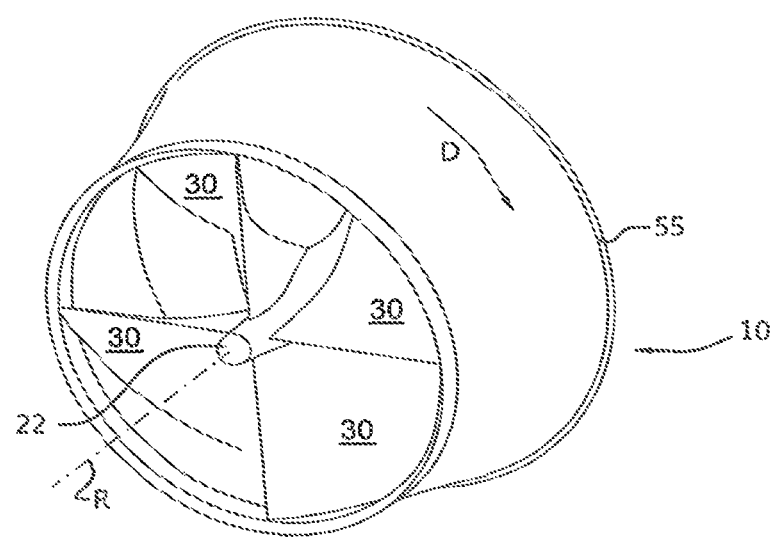
FIG. 6 shows in a perspective view onto the front an exemplary embodiment of the turbine unit of the wind turbine of FIG. 1.
Figure 7:
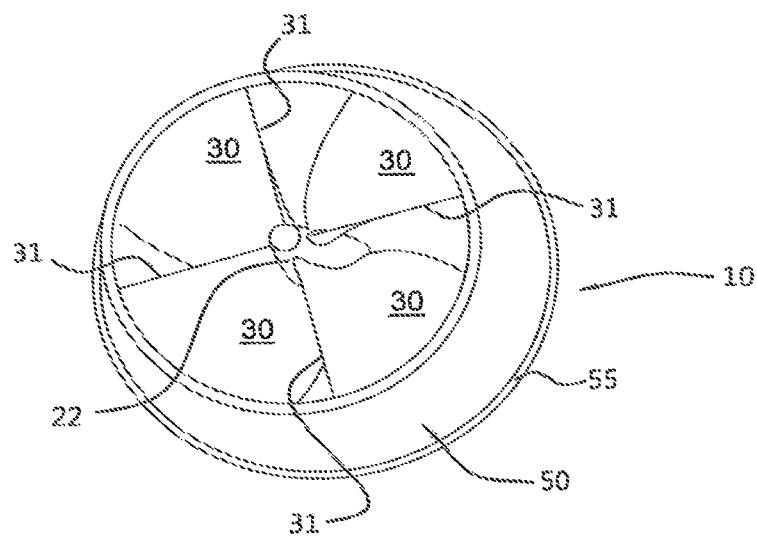
FIG. 7 shows another perspective view onto the front of the turbine unit of FIG. 6.
Figure 8:
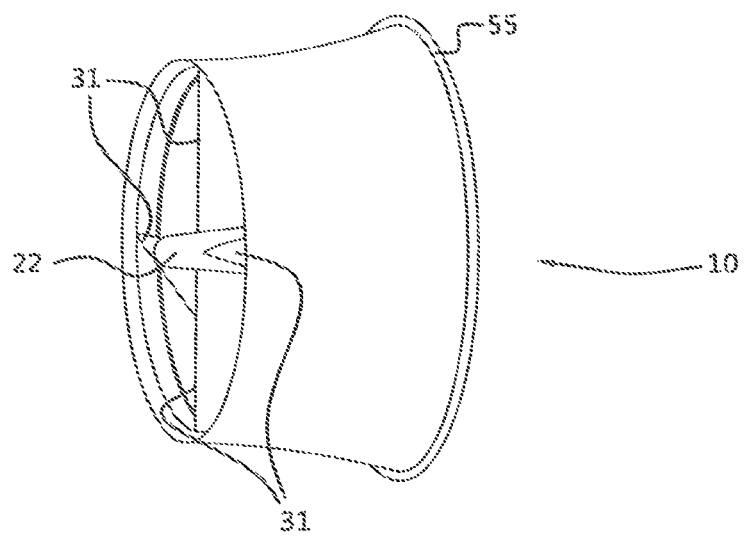
FIG. 8 shows a perspective view onto the side of the turbine unit of FIG. 6.
Figure 9:
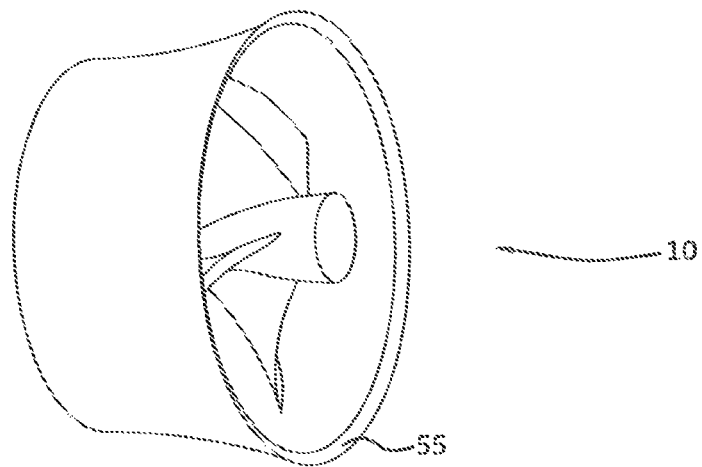
FIG. 9 shows a perspective view onto the rear of the turbine unit of FIG. 6.
Figure 10:
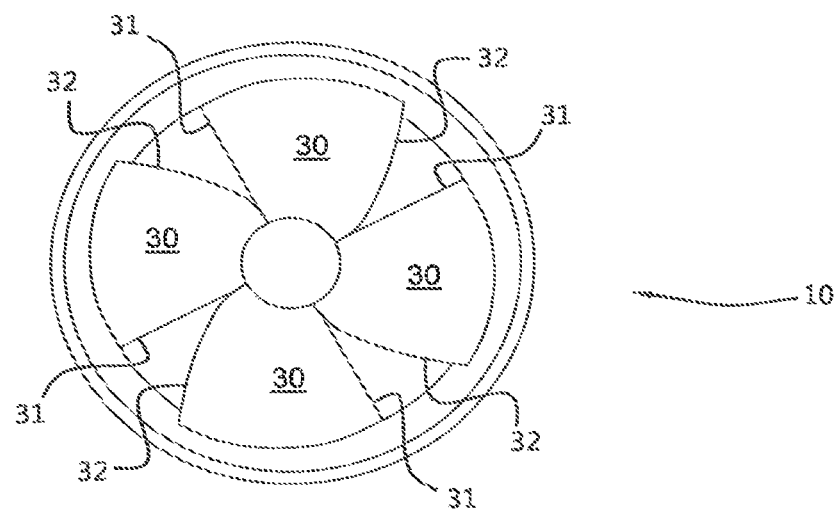
FIG. 10 shows another perspective view onto the rear of the turbine unit of FIG. 6.
Figure 11:
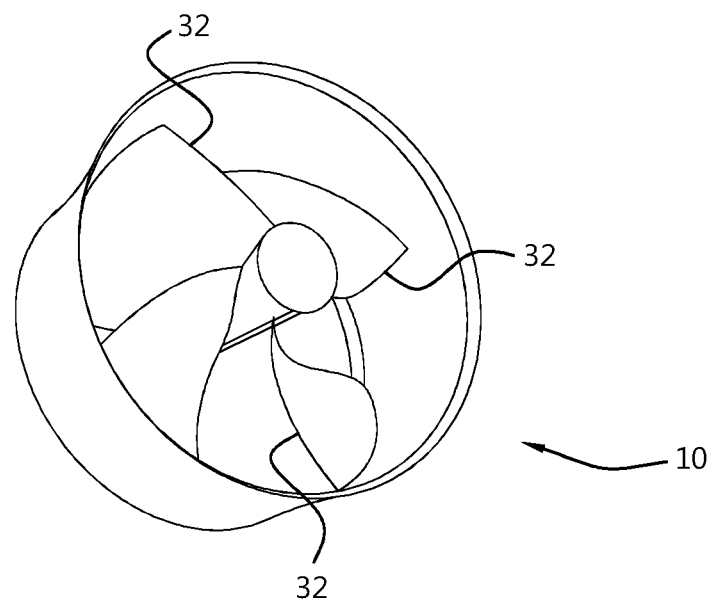
FIG. 11 shows yet another perspective view onto the rear of the turbine unit of FIG. 6.
Figure 12:
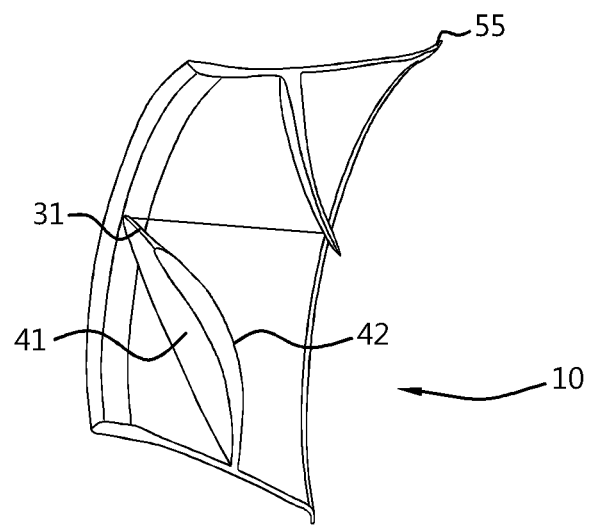
FIG. 12 shows a section through the turbine unit of FIG. 6.
Figure 13:
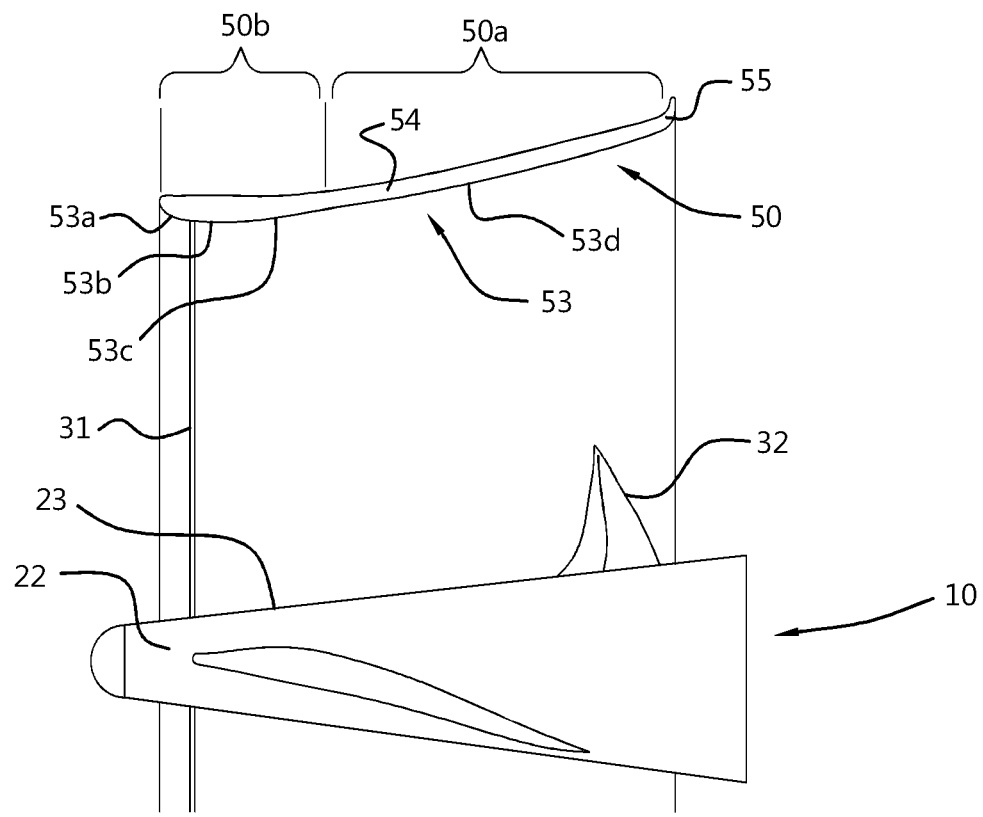
FIG. 13 shows in an axial section a part of the turbine unit of FIG. 6.
Figure 14:
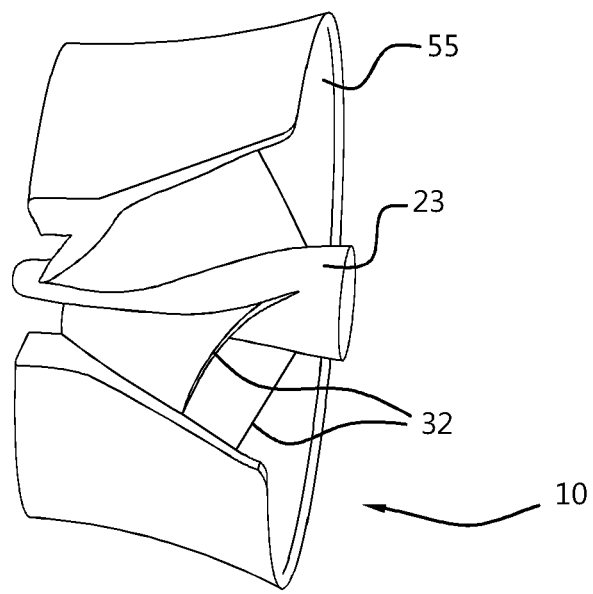
FIG. 14 shows the turbine unit of FIG. 6 with a part being removed to expose the interior structure.
Figure 15:
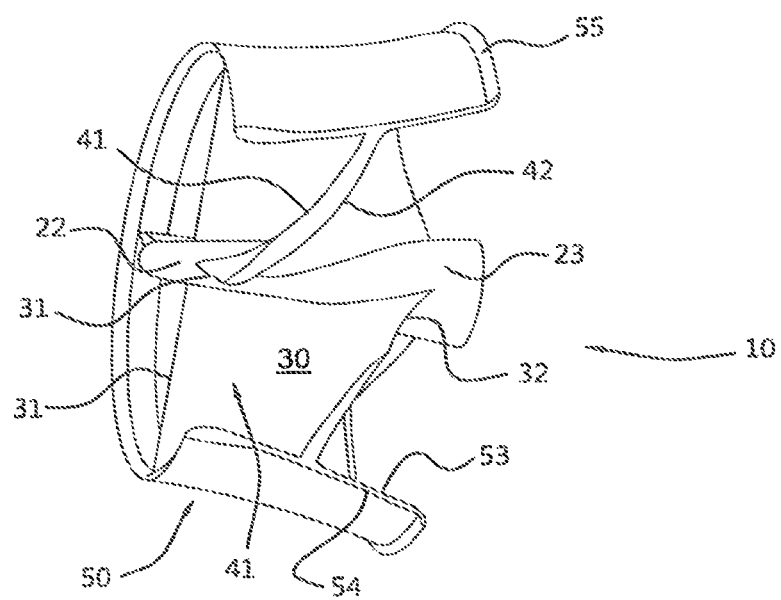
FIG. 15 shows the turbine unit of FIG. 6 with a larger part being removed.
Figure 16:
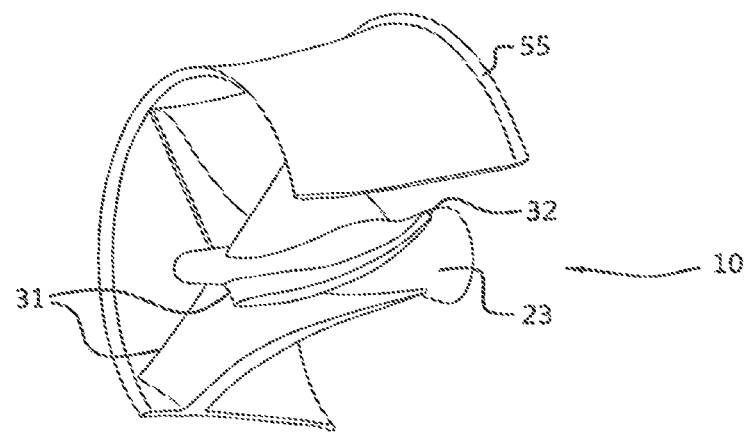
FIG. 16 shows the turbine unit of FIG. 6 with an even larger part being removed.

With reference to the figures a horizontal axis wind turbine will be discussed, which is envisaged for instance for use as an urban wind turbine.

The wind turbine 1 comprises a turbine unit 10, a turbine unit supporting frame 60, a generator 70 that is configured for generating electrical energy, and a yaw bearing mechanism 100.

The yaw bearing mechanism 100 connects the wind turbine 1 to a support structure 110, e.g. configured to be placed on a roof of a building, e.g. configured as mast, etc. The yaw bearing mechanism 100, e.g. of a free yawing design, is configured for mounting the turbine unit supporting frame 60 to the support structure 110 such that the turbine unit supporting frame 60 is rotatable about a Z-axis, preferably over 360 degrees.

The turbine unit supporting frame 60 comprises:
  a lower frame member 61 extending underneath the turbine unit 10,
  a front turbine supporting arm 62 that is connected to the lower frame member 61 and extends in front of the turbine unit 10,
  a rear turbine supporting arm 63 that is connected to the lower frame member 61 and extends behind the turbine unit 10.

The turbine unit 10 comprises:
  a central hub 22 arranged on a horizontal rotation axis R, said central hub having a front end and a rear end, said central hub having an exterior hub surface 23, a plurality of rigid twisted blades 30, and
an outer tubular shroud 50 having a front end 51 and a rear end 52, an inner shroud surface 53, an inner diameter defined by said inner shroud surface, and an outer shroud surface 54,
an outwardly protruding annular brim flange 55 at the rear end 52 of the outer tubular shroud 50.

Each of the arms 62, 63 supports the central hub 22 of the turbine unit 10 on one or more bearings 64, 65, e.g. one or more bearings being part of the electrical generator 70.

The outer tubular shroud 50 has over a majority of the shroud length, e.g. at least 60% of the shroud length, a conical shroud section 50a that extends up to the rear end of the outer tubular shroud, where the brim flange 55 is arranged. In this conical shroud section 50a the inner shroud surface 53 and the outer shroud surface 54 each gradually increase in diameter towards the rear end 52 of the outer tubular shroud.

As preferred, in this section 50a, the inner shroud surface 53 and the outer shroud surface 54 are generally parallel to one another.

The outer tubular shroud 50 has a leading shroud section 50b extending from the front end 51 of the outer tubular shroud to the conical shroud section 50a.

It is illustrated that in the leading shroud section 50b the outer shroud surface 54 has a substantially constant diameter, which adjoins and gradually continues as the conical outer surface of section 50a. The outer shroud surface 54 is smooth and of circular cross-section, devoid of any air flow disrupting features apart from the brim flange 55 at the rear end 52.

The outer tubular shroud is provided with an outwardly protruding annular brim flange 55 at the rear end 52 of the outer tubular shroud, so at the rear end of the conical section 50a.

It is illustrated that the central hub 22 comprises a conical hub section in which the exterior hub surface 23 increases in diameter towards the rear end of the central hub. In fact, in this example, the central hub 22 is conical over its entire axial length.

The conical hub 22 extends over a length along the rotation axis R at least through the conical shroud section 50a. So, the section 50a and the conical hub section are concentrically arranged, so that the airflow is bounded in this axial zone of the turbine unit 10 by an inner conical surface formed by the hub 22 and an outer conical surface bounded by the section 50a. Preferred embodiments hereof will be discussed below.

The turbine unit 10 is rotatable about a horizontal rotation axis R to drive an electric generator 70 in a direction of rotation D.

The Z-axis of the yaw bearing mechanism is (much) closer to the front of the turbine unit than to the back, so as to obtain a stable orientation of the turbine unit 10 relative to the incoming wind.

Generally, the wind turbine is configured so that, in use, wind flows through and past the turbine unit 10 including along the inner shroud surface 53 and the outer shroud surface 54 from the front end 51 to the rear end 52 of the outer tubular shroud. So, the shroud 50 is not surrounded by any stationary mounted shroud.

The drawings illustrate that the turbine unit 10 has between 3 and 7 blades 30, here—as preferred—four blades 30.

The electrical generator 70 is mounted on the forward arm 62, in line with the rotation axis R and the central hub 22 of the turbine unit 10. It is noted that by suitably dimensioning the generator, any disturbance of the airflow into the unit 10 by the generator 70 is not problematic for the overall efficiency as the air close to the central hub is of lesser importance for the output than the airflow closer to the outer shroud.

In an alternative design, the electrical generator 70 is mounted on the rearward arm 63, in line with the rotation axis R and the central hub 22 of the turbine unit 10. This arrangement may be beneficial in view of airflow. However, the mass of the generator 70 is then further away from the Z-axis, which may impairs the desired stability of the orientation of the turbine unit 10 relative to the incoming wind, in particular in a free-yawing design.

It is illustrated that there is, as preferred, no transmission between the unit 10 and the generator 70. Therefore, a rotor part of the generator 70 is in a direct-drive arrangement and revolves at the same RPM as the unit 10, whilst the stator part in the housing of the generator 70 is stationary mounted on the support 60.

It is illustrated that a brake device 90 is provided to brake the turbine unit 10, e.g. to lock the turbine unit 10 for performing maintenance or in other circumstances. It is illustrated here that, for example, the brake device 90 is mounted between the support frame 60 and the shaft connecting the generator 70 to the central hub 22. For example, the brake device is embodied as a disc brake (as shown), with a disc on the shaft and a caliper on the support frame, here the arm 62.

It is shown that the housing of the generator 70 may be generally cylindrical with the main generator axis aligned with the axis of rotation R.

The turbine unit 10 here has four blades 30, which is preferred for a smallest inner surface diameter range between 2 and 3 meters as shown here.

Each rigid twisted blade 30 has a leading edge 31, a trailing edge 32, a chord length between the leading edge and the trailing edge, a root end 34, and a tip end 35.

The root end 34 of each blade is fully integral with the central hub 22 and the tip end 35 is fully integral with the outer tubular shroud 50 so that the turbine unit 10 is a rigid unit.

The leading edge 31 and the trailing edge 32 each adjoin the outer tubular shroud 50. The leading edge 31 and the trailing edge 32 also adjoin the central hub 22.

Each twisted blade 30 has a first main surface 41 and an opposed second main surface 42. Each of these first main surface 41 and second main surface 42 extends from the leading edge 31 to the trailing edge 32. Seen in the direction of rotation (D) of the turbine unit 10 during operation, the first main surface 41 precedes or is ahead of the second main surface 42. As will be appreciated one could also identify surface 41 as upper surface and surface 42 as lower surface of an aerofoil profile.

The chord length of each twisted blade 30 is at least ⅕, e.g. as here at least ⅓, of a smallest inner diameter of the outer tubular shroud 50.

The first main surface 41 and the second main surface 42 of the twisted blades 30 each have a gradual twist from the leading edge 31 towards the trailing edge 32, which twist is counter to the direction of rotation D.

Each twisted blade 30 is embodied as an aerofoil having a profile with a mean camber line midway between the first main surface 41 and second main surface 42. As can be seen the profile has a thickness that varies in direction of the camber line. Herein the thickness is perpendicular to the camber line.

As will be appreciated by the skilled person the profile of the aerofoil of each blade is configured to produce a lift force that contributes to the rotation of the turbine unit in the electricity producing direction of rotation D.

It is illustrated that the leading edge of each twisted blade 30 extends substantially rectilinear and in radial direction from the central hub 22 to the outer tubular shroud 50. As preferred, the leading edges are located in a plane perpendicular to the rotation axis. As preferred, the leading edges are inward from the front end of the shroud 50, here just behind the bevelled nose of the shroud 50.

It is illustrated that, seen in front view, the root end of each twisted blade 30 develops about the central hub 22 over an angle relative to the rotation axis that is greater in degrees than 360/number of blades and less in degrees than 720/number of blades. For the depicted four blades embodiment, the angle is between 90° and 180°

It is illustrated that, seen in front view, the tip end of each twisted blade 30 develops along the inner shroud surface 54 over an angle relative to the rotation axis R that is less in degrees than 360/number of blades. For the depicted four-blade embodiment, this angle is less than 90°.

It is illustrated that, seen in front view, each blade 30 overlaps in front of one adjacent blade in proximity to the central hub 22, and the leading edge of said overlapping blade and the trailing edge of the one adjacent blade from boundaries of an unobstructed axial opening through the turbine unit. This contributes to an enhanced airflow rate through the turbine unit 10.

It is illustrated that the trailing end 32 of each twisted blade 30 adjoins the outer tubular shroud 50 at an axial spacing forward from a plane defined by the rear end 52 of the outer tubular shroud. This axial spacing is at least 15%, preferably between 20% and 40%, e.g. about 30% of the length of the outer tubular shroud.

It is illustrated that the trailing end 32 of each twisted blade 30 adjoins the central hub 22 at an axial location that is at most 10% of the length of the outer tubular shroud forward from the plane defined by the rear end of the outer tubular shroud.

In the depicted design of the turbine unit 10, whereof all parts are shown to scale in the drawings, the outer tubular shroud has a smallest diameter of 2.73 metres.

The conical shroud section 50a has a taper angle between 10° and 20°, e.g. between 12° and 18°, here about 15°.

It is illustrated that the conical hub section 22 has a taper angle that is smaller than the taper angle of the conical shroud section 50a, e.g. between 5° and 10°.

The conical hub section 22 extends rearward beyond the conical shroud section 50a. As illustrated, the hub section extends rearward, preferably, over a length that is at least 10% of the length of the outer tubular shroud.

It is illustrated that—measured in a plane defined by the rear end 52 of the outer tubular shroud 50—the exterior hub surface of the central hub 22 has a diameter of at least 10%, e.g. at least 15%, e.g. at most 25%, e.g. between 10-25%, of the inner diameter of the outer tubular shroud in said plane. In the depicted embodiment, the diameter of the central hub 22 in this plane is about 0.64 meters and the inner diameter of the outer tubular shroud about 3.35 meters. So about 19%.

It is illustrated that—in the leading shroud section 50b—the outer shroud surface 54 has a substantially constant diameter.

It is illustrated that—in the leading shroud section 50b—the inner shroud surface 53 has at the front end an inward bevelled nose portion 53a that adjoins a substantially constant diameter portion 53b, that in turn adjoins a conical inner surface portion 53c that forms a forward continuation of the conical inner surface 53d of the conical shroud section 50a.

In embodiments, the smallest inner diameter of the outer tubular shroud is at least 1 meter, e.g. between 1.5 and 4 meters, e.g. between 2 and 3 meters, here about 2.75 meters. In combination with the preferred limited number of blades 30, e.g. four, this results in rather big blades and an open design of the turbine unit, enhancing overall efficiency of the wind turbine.

The smallest inner diameter here is defined by the constant diameter portion 53b.

In another embodiment, the shroud 50 could be embodied with a throat that defines the smallest inner diameter.

The length of the outer tubular shroud 50 is between 0.40 and 1.0 times the smallest inner diameter of the outer shroud, for example, the ratio is about 0.6. This range is, for example, practical in combination with a smallest inner diameter of at least 1 meter, e.g. between 1.5 and 5 meter, e.g. between 2 and 3 meters. In the depicted embodiment, the length is 1.57 meters, so about 57% of the smallest inner diameter. As explained, this is relatively long In embodiments, as illustrated, the brim flange is directed at an angle of at least 45°, preferably at least 60°, relative to the rotation axis R. In embodiments, as illustrated, this angle is less than 90°.

In embodiments, as illustrated, the brim flange has an outer diameter of at most 110% of the maximum diameter of the conical shroud section direct forward of the brim flange. For example, this maximum is practical in combination with a smallest inner diameter of at least 1 meter, e.g. between 1.5 and 5 meter, e.g. between 2 and 3 meters. In the depicted embodiment, the outer diameter of the brim flange 55 is 3.47 meter, whereas the root of the brim (so the maximum diameter of the conical section 50a) has a diameter of 3.37 meter. That means that the brim flange 55 only adds some 3%, e.g. between 2 and 5%, to the maximum shroud diameter.

Generally, the brim flange in the inventive combination does not need to be large in order to obtain the benefits of the inventive combination of features.

It is illustrated that the turbine unit is mainly made of plastic material(s), as is preferred. The central hub 22, the rigid twisted blades, and the outer shroud are preferably made of plastic material, e.g. of composite plastic material.

A metallic, e.g. steel, shaft 24a extends through the central hub 22, e.g. a hollow shaft 24a.

The shaft 24a is supported on the bearings 64, 65, e.g. the shaft 24a being connected in line with a shaft of generator 70.

It is shown that the steel shaft 24a has steel flanges 24b, 24c at the front and at the rear of the turbine unit, to which the composite plastic material turbine unit is fastened.

The invention claimed is:

1. A horizontal axis wind turbine, comprising a turbine unit, a turbine unit supporting frame, a generator configured for generating electrical energy, and a yaw bearing mechanism, wherein the turbine unit is supported on one or more bearings by the turbine unit supporting frame, wherein the turbine unit is rotatable about a horizontal rotation axis to drive the generator in a direction of rotation, wherein the yaw bearing mechanism is configured for mounting the turbine unit supporting frame to a support structure such that the turbine unit supporting frame is rotatable about a Z axis, the turbine unit comprising:
  a central hub arranged on said horizontal rotation axis, said central hub having a front end and a rear end, said central hub having an exterior hub surface,
  a plurality of rigid twisted blades, and
  an outer tubular shroud having a front end, a rear end, an inner shroud surface, an inner diameter defined by said inner shroud surface, and an outer shroud surface, an outer diameter defined by said outer shroud surface, and a shroud length between said front end of the outer tubular shroud and said rear end of the outer tubular shroud along said horizontal rotation axis,
wherein the wind turbine is configured so that, in use, wind flows through and past the turbine unit including along the inner shroud surface and the outer shroud surface from the front end of the outer tubular shroud to the rear end of the outer tubular shroud,
wherein each rigid twisted blade of the plurality of rigid twisted blades has a leading edge, a trailing edge, a chord length between said leading edge and said trailing edge, a root end, and a tip end,
wherein the root end is integral with the central hub and the tip end is integral with the outer tubular shroud so that the turbine unit is rigid, wherein the leading edge and the trailing edge adjoin the outer tubular shroud, and wherein the leading edge and the trailing edge adjoin the central hub,
wherein each rigid twisted blade of the plurality of rigid twisted blades has a first main surface and an opposed second main surface, each of said first main surface and said second main surface extending from the leading edge to the trailing edge, wherein, seen in the direction of rotation of the turbine unit during operation, the first main surface precedes the second main surface,
wherein a chord length of each rigid twisted blade of the plurality of rigid twisted blades is at least ⅓ of a smallest inner diameter of the outer tubular shroud,
wherein the first main surface and the second main surface of each rigid twisted blade of the plurality of rigid twisted blades have a gradual twist from the leading edge towards the trailing edge, wherein the gradual twist is counter to the direction of rotation,
wherein each rigid twisted blade of the plurality of rigid twisted blades is embodied as an aerofoil having a profile with a camber line midway between the first main surface and the second main surface, wherein the profile has a thickness that varies in direction of the camber line, said thickness being perpendicular to the camber line,
wherein the profile of the aerofoil is configured to produce a lift force that contributes to said rotation of the turbine unit in said direction of rotation,
wherein the outer tubular shroud has a conical shroud section over at least 60% of the shroud length, the conical shroud section extends up to the rear end of the outer tubular shroud, within the conical shroud section, the inner shroud surface and the outer shroud surface each gradually increase in diameter towards the rear end of the outer tubular shroud,
wherein the outer tubular shroud is provided with an outwardly protruding annular brim flange at the rear end of the outer tubular shroud,
wherein the central hub comprises a conical hub section in which the exterior hub surface increases in diameter towards the rear end of the central hub, wherein the conical hub section extends over a length along the rotation axis at least through the conical shroud section.

2. The wind turbine according to claim 1, wherein said conical shroud section has a taper angle between 10° and 20°.

3. The wind turbine according to claim 2, wherein the conical hub section has a taper angle between 5° and 10°, wherein the taper angle of the conical hub section is smaller than the taper angle of the conical shroud section.

4. The wind turbine according to claim 1, wherein the conical hub section extends rearward beyond the conical shroud section over a length that is at least 10% of the length of the outer tubular shroud.

5. The wind turbine according to claim 1, wherein, measured in a plane defined by the rear end of the outer tubular shroud, the exterior hub surface of the central hub has a diameter of at least 15% of the inner diameter of the outer tubular shroud.

6. The wind turbine according to claim 1, wherein the outer tubular shroud has a leading shroud section extending from the front end of the outer tubular shroud to the conical shroud section, wherein, in the leading shroud section, the outer shroud surface has a constant diameter.

7. The wind turbine according to claim 6, wherein, in the leading shroud section, the inner shroud surface, has at the front end of the outer tubular shroud an inward beveled nose portion that adjoins a constant diameter portion, the constant diameter portion adjoins a conical inner surface portion, and the conical inner surface portion forms a forward continuation of the conical inner surface of the conical shroud section.

8. The wind turbine according to claim 1, wherein the trailing edge of each rigid twisted blade of the plurality of rigid twisted blades adjoins the outer tubular shroud at an axial spacing forward from a plane defined by the rear end of the outer tubular shroud, which axial spacing is between 20% and 40% of the length of the outer tubular shroud, wherein the trailing edge of each rigid twisted blade of the plurality of rigid twisted blades adjoins the central hub at an axial location that is at most 10% of the length of the outer tubular shroud forward from the plane defined by the rear end of the outer tubular shroud.

9. The wind turbine according to claim 1, wherein the turbine unit has four of the rigid twisted blades.

10. The wind turbine according to claim 1, wherein the leading edge of each rigid twisted blade of the plurality of rigid twisted blades extends rectilinear and in a radial direction from the central hub to the outer tubular shroud.

11. The wind turbine according to claim 10, wherein, seen in a front view, the root end of each rigid twisted blade of the plurality of rigid twisted blades develops about the central hub over an angle relative to the rotation axis that is equal or greater in degrees than 360/number of blades and equal or less in degrees than 720/number of blades, and wherein, seen in the front view, the tip end of each rigid twisted blade of the plurality of rigid twisted blades develops along the inner shroud surface over an angle relative to the rotation axis that is equal or less in degrees than 360/number of blades, so that in said front view each rigid twisted blade of the plurality of rigid twisted blades overlaps in front of one adjacent blade in proximity to the central hub, and so that, in the front view, the leading edge of said overlapping blade and the trailing edge of the one adjacent blade from boundaries of an unobstructed axial opening through the turbine unit.

12. The wind turbine according to claim 1, wherein the turbine unit has four of the rigid twisted blades, wherein the leading edge of each rigid twisted blade of the plurality of rigid twisted blades extend substantially rectilinear and in a radial direction from the central hub to the outer tubular shroud and, seen in a front view, perpendicular to one another.

13. The wind turbine according to claim 1, wherein the smallest inner diameter of the outer tubular shroud is at least 1 meter.

14. The wind turbine according to claim 1, wherein the central hub comprises a metallic hollow shaft, and wherein the plurality of rigid twisted blades, the outer shroud, and the central hub are made of plastic material.

15. The wind turbine according to claim 1, wherein the turbine unit supporting frame comprises:
   a lower frame member extending underneath the turbine unit;
   a front turbine supporting arm connected to the lower frame member and extending in front of the turbine unit; and
   a rear turbine supporting arm connected to the lower frame member and extending behind the turbine unit,
   wherein each of the front turbine supporting arm and the rear turbine supporting arm supports the central hub of the turbine unit on one or more bearings of the one or more bearings.

16. The wind turbine according to claim 15, wherein the electrical generator is arranged on the front turbine supporting arm in axial alignment with the central hub of the turbine unit.

* * * * *